United States Patent [19]

Staege et al.

[11] 3,973,923
[45] Aug. 10, 1976

[54] PROCESSES FOR THE PRODUCTION OF METHANE-CONTAINING GASES

[75] Inventors: Hermann Staege; Eberhard Goeke, both of Essen, Germany

[73] Assignee: Krupp-Koppers GmbH, Essen, Germany

[22] Filed: Oct. 31, 1974

[21] Appl. No.: 519,755

[30] Foreign Application Priority Data
Nov. 30, 1973 Germany............................ 2359741

[52] U.S. Cl. .............................. 48/197 R; 48/206;
48/215; 260/449 M
[51] Int. Cl.² .......................................... C10J 1/00
[58] Field of Search.................. 48/206, 215, 197 R;
260/449 M; 252/373; 423/230, 231

[56] References Cited
UNITED STATES PATENTS

| | | | |
|---|---|---|---|
| 3,441,370 | 4/1969 | Gutmann et al. .................. | 423/230 |
| 3,511,624 | 5/1970 | Humphries et al. ............. | 260/449 M |
| 3,854,895 | 12/1974 | Muller............................. | 260/449 M |

FOREIGN PATENTS OR APPLICATIONS

| | | | |
|---|---|---|---|
| 894,901 | 4/1962 | United Kingdom................. | 423/231 |

*Primary Examiner*—Robert L. Lindsay, Jr.
*Assistant Examiner*—George C. Yeung
*Attorney, Agent, or Firm*—Michael J. Striker

[57] ABSTRACT

A process for the production of a gas having a methane content between 40 and 99% by volume from a gas mixture which contains hydrogen, carbon dioxide, and at least 20% by weight of carbon monoxide which comprises the following steps:
 a. humidifying the gas mixture by mixing water vapor therewith,
 b. subjecting the humidified gas mixture to a partial catalytic conversion so as to reduce its content of carbon monoxide to between 10 and 20% by volume,
 c. desulfurizing the partially converted gas mixture,
 d. subjecting the desulfurized gas mixture to a first catalytic methanation step,
 e. cooling and dehumidifying the resulting gas mixture,
 f. reheating the said cooled and dehumidified gas mixture and subjecting it to a second catalytic methanation step, and
 g. cooling and scrubbing the resulting gas mixture to remove carbon dioxide therefrom,
the heat released in the conversion step $b$ and the methanation steps $d$ and $f$ being used to supply heat to the warm-water cycle in the process and generate additional amounts of steam, and the water formed during the methanation steps $d$ and $f$ being used to supply the water that is required in the conversion step $b$.

8 Claims, 1 Drawing Figure

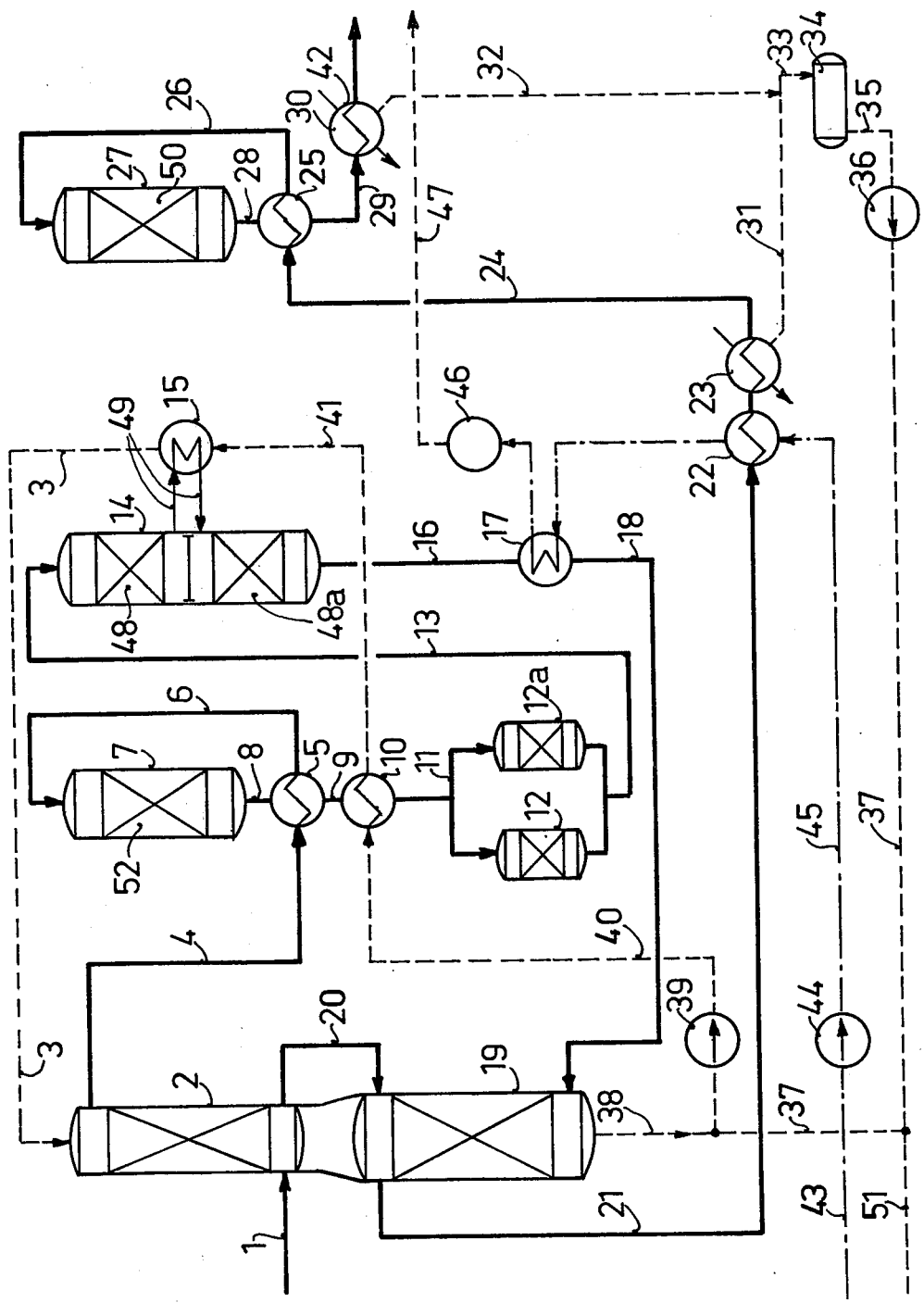

PROCESSES FOR THE PRODUCTION OF METHANE-CONTAINING GASES

BACKGROUND OF THE INVENTION

The present invention pertains to a process for the production of a methane-containing gas having a methane content between 40 and 99% by volume from gases which contain, besides hydrogen and carbon dioxide, more than 20% by volume of carbon monoxide by catalytic conversion and methanation followed by washing to remove carbon monoxide therefrom.

Heretofore fuel gases rich in methane have been produced from gases containing hydrogen, carbon monoxide and carbon dioxide by use of nickel-containing catalysts in accordance with the following equilibrium equations:

$$CO_2 + 4H_2 \rightleftharpoons CH_4 + 2H_2O \qquad \text{I.}$$

$$CO + 3H_2 \rightleftharpoons CH_4 + H_2O \qquad \text{II.}$$

Both of the foregoing so-called methanation reactions (proceeding from left to right of the equations) are strongly exothermic. These reactions have long been used in industry to remove in this manner the carbon monoxide which is highly toxic for some catalysts from synthesis gas which is used for the synthesis of ammonia. Another important use of these reactions is in processes for the production of fuel gases which, because of their high contents of methane, can be used to replace natural gas.

Gases containing more than 20% by volume of carbon monoxide that can be treated in accordance with the processes of the present invention are produced in various known processes. Such gases are preferably produced by partially oxidizing and thereby gasifying solid or liquid fuels such as coal, lignite, peat, or heavy petroleum oils. They can also be produced by the catalytic cracking of hydrocarbons. It is also possible to use gases from other sources, such as, for example, so-called producer and water gases having suitable compositions.

Such gases containing carbon monoxide, carbon dioxide, and hydrogen, do not react solely in accordance with the foregoing equations I and II during methanation but also undergo a further conversion in a so-called water-gas reaction in accordance with the following equilibrium equation:

$$CO + H_2O \rightleftharpoons CO_2 + H_2 \qquad \text{III.}$$

This reaction (proceeding from left to right), which is often referred to as the conversion reaction, and is so referred to herein simply as such, is likewise exothermic. However, the velocity of the reaction that is produced when nickel catalysts are used is smaller than that produced in the methanation reactions in accordance with equations I and II.

From the foregoing it can be assumed that it must be possible also to treat gases which contain little hydrogen and much carbon monoxide with nickel catalysts for simultaneous conversion and methanation of a portion of the carbon monoxide contained therein. The coupling of the methanation reaction in accordance with equations I and II with the conversion reaction in accordance with equation III is quite desirable because the water that is required for the conversion reaction is generated in the methanation reactions.

Experience acquired by actual practice has shown, however, that it was heretofore not possible satisfactorily to perform together both the methanation and the conversion reactions. It was further established that, even after a relatively short period, a deposit of carbon or soot would form on the nickel-containing methanation catalyst, thereby greatly impairing or suppressing its activity.

SUMMARY OF THE INVENTION

The principal object of the present invention is to provide an improved process of the foregoing type for the production of a methane-containing gas having a methane content between 40 and 99% by volume from a gas containing more than 20% by volume of carbon monoxide by methanation and conversion reactions in which the formation of carbon deposits on the nickel catalyst is avoided. Such a process moreover has great economic advantages.

The foregoing objects are attained in accordance with the processes of the present invention by subjecting the humidified gases that are to be treated to a partial conversion so that the residual content of carbon monoxide in the gas is between 10 and 20% by volume. The partially converted gas is then desulfurized and subsequently subjected to a first methanation treatment, after which the gas is cooled and dried. The gas is then reheated and subjected to a second methanation treatment, again cooled and dried, and then washed to remove carbon dioxide therefrom, in which process the exothermic heat that is released in the conversion and methanation reactions is utilized for heating the water circulating through a warm-water cycle that circulates through various units in the process as well as to generate additional steam. The water that is generated in the methanation reactions is used to supply the water that is required in the conversion reaction.

DETAILED DESCRIPTION AND PREFERRED EMBODIMENTS OF THE INVENTION

The process of the present invention is derived from the following considerations:

The formation of soot and its deposition on a nickel-containing methanation catalyst is attributed largely to a great demand for hydrogen that occurs during the spontaneous methanation reactions I and II that set in at a temperature of about 300°C, as a consequence of which the partial pressure of carbon monoxide in the gas that is being treated rises rapidly. At the same time, the exothermic methanation reactions produce a rapid rise in temperature. Because of the rise in the partial pressure of carbon monoxide and the temperature of the gas that is being treated, soot is formed in accordance with the Boudouard equilibrium equation:

$$2 CO \rightleftharpoons CO_2 + C \qquad \text{IV.}$$

This reaction is prevented in accordance with the present invention by reducing the partial pressure of carbon monoxide in the gas to be treated by partial conversion of the carbon monoxide therein prior to the methanation reactions. A further lowering of the partial pressure of carbon monoxide is then produced by the exceeding water vapour from the partial conversion which is not removed from the gas before the first methanation. The gas is then first dried only after completion of the first methanation reaction.

The further details of the processes of the present invention are illustrated and described by reference to the accompanying drawing which is a flow sheet of the process representing only the essential portions of plant and apparatus that are required.

A typical gas that is to be treated in accordance with the process of the present invention has the following composition in percentages by volume:

| | |
|---|---|
| Carbon dioxide ($CO_2$) | 10% |
| Carbon monoxide (CO) | 59% |
| Hydrogen ($H_2$) | 30% |
| Nitrogen and argon ($N_2$ + Ar) | 1% |

This gas, which was obtained by gasification of coal, is passed at an absolute pressure of approximately 30 atmospheres through a supply line 1 into a humidifier 2 into which a stream of warm water is passed through a supply line 3. In this manner the gas is warmed and saturated with water vapor. The thus-wetted gas is then passed through a conduit 4, a heat exchanger 5, and a conduit 6 into a reactor 7 containing a bed 52 of a conventional iron-containing conversion catalyst in which partial conversion of the gas is effected. The reactor 7 is maintained at a temperature between 350° and 550°C and at an absolute pressure of about 29 atmospheres. The partially converted gas which leaves the reactor 14 through a conduit 8 has the following composition in percentages by volume on a dry basis:

| | |
|---|---|
| Carbon dioxide ($CO_2$) | 35.6% |
| Carbon monoxide (CO) | 10.0% |
| Hydrogen ($H_2$) | 53.8% |
| Nitrogen and argon ($N_2$ + Ar) | 0.6% |

The thus-warmed wet gas is then passed from the conduit 8 through the heat exchanger 5, a conduit 9, a heat exchanger 10, and a conduit 11 into a desulfurizing unit composed of two reactors 12 and 12a, each of which is packed with granules of a solid desulfurizing agent, for example, with an agent containing zinc oxide or manganese oxide. The desulfurization of the gas is effected at a temperature of approximately 300°C. The two reactors 12 and 12a are so arranged that the flow of the gas thereinto can be switched from one to the other so that one of the reactors may be regenerated while the other is being used for desulfurization.

After leaving the desulfurizing unit through a conduit 13, the gas is passed to a methanation reactor 14 in which the first methanation step is effected. This methanation reactor 14 is divided into two sections which are separated from each other by a partition which separates the gas at the bottom of the upper section from the gas at the top of the lower section. In each of the two sections of the methanation reactor 14, stationary or fixed beds of catalyst 48 and 48a, one above the other, are provided. The catalyst in both beds is a conventional nickel-containing methanation catalyst. The gas entering the methanation reactor 14 is first passed over the upper catalyst bed 48 and then through a cooling unit 15 by means of a conduit 49 which passes through the cooling unit 15 and returns the cooled gas to the lower catalyst bed 48a in the methanation reactor 14. In both catalyst beds 48 and 48a the methanation reaction proceeds from left to right in accordance with the equilibrium equations I and II hereinbefore.

An equilibrium between carbon monoxide, carbon dioxide, hydrogen, and water in accordance with equation III hereinbefore is also established in the catalyst beds at various different temperature intervals.

During the methanation reaction the temperature of the gas must not be permitted to rise substantially above 500°C, for which purpose the cooler 15 is provided between the two catalyst beds 48 and 48a so that the gas from the bed 48 can be cooled before entering the lower catalyst bed 48a.

To prevent a too-rapid temperature rise during the methanation reaction, carbon monoxide and water vapor, both of which are present in relatively high proportions in the partially converted gas, are also introduced into the methanation reactor 14 in accordance with the process of the present invention. Carbon dioxide and water vapor both have a high specific heat, that is, a large number of calories are required to raise the temperature of 1 gram of each gas 1 centigrade degree. The gas entering the methanation reactor 14 has a temperature of approximately 300°C whereas the temperature of the gas leaving the reactor 14 is between approximately 450° and 500°C. At this latter temperature the partially methanated gas is passed through a conduit 16 into a waste-heat boiler 17 where its sensible heat is utilized for the generation of steam. Subsequently the gas is passed through a conduit 18 to a dehumidifier 19 in which the gas is washed with cold water that is charged thereinto from the humidifier 2 through a conduit 20. By means of this washing with cold water, the gas is cooled further and a portion of the accompanying water vapor is condensed and thus withdrawn therefrom.

The cooled gas is then passed through a conduit 21 to a feed-water preheater 22 and a cooler 23, then through a conduit 24 into a heat exchanger 25, and from there through a conduit 26 into a methanation reactor 27 in which a second methanation step is effected.

A further portion of the sensible heat is withdrawn from the gas in the feed-water preheater 22 and the gas is cooled to such a degree in the cooler 23 that the greatest portion of its previously uncondensed accompanying water vapor is condensed, thereby influencing favorably the methanation equilibrium in this second methanation step in the direction of methane formation. In the heat exchanger 25, the gas is again preliminarily heated to a temperature between approximately 300° and 320°C. The methanation reactor 27 is also packed with a catalyst bed 50 composed of granules of a conventional nickel-containing methanation catalyst. The methanated gas in this case leaves the methanation reactor 27 through a conduit 28 at a temperature of approximately 320°C and passes through the heat exchanger 25 where it warms preliminarily the gases passing therethrough through conduit 24 and from which it is discharged through a conduit 29 into a cooler 30 and from there through a conduit 42 to a unit for washing carbon dioxide therefrom that is not represented in the drawing. The gas leaving the conduit 42 has the following composition in percentages by volume:

| | |
|---|---|
| Carbon dioxide ($CO_2$) | 64.2% |
| Carbon monoxide (CO) | 0.1% |
| Hydrogen ($H_2$) | 0.2% |
| Nitrogen and argon ($N_2$ + Ar) | 1.0% |
| Methane ($CH_4$) | 34.5% |

The carbon dioxide is then removed from this gas by washing it with an alkaline solution such as a solution of an alkali-metal carbonate or hydroxide. After removal of the carbon dioxide, a final gas is obtained which has the following composition in percentages by volume:

| | |
|---|---|
| Carbon dioxide (CO$_2$) | 0.1% |
| Carbon monoxide (CO) | 0.3% |
| Hydrogen (H$_2$) | 0.4% |
| Nitrogen and argon (N$_2$ + Ar) | 2.8% |
| Methane (CH$_4$) | 96.4% |

This gas can, because of its high content of methane, be sold as a substitute for natural gas without further treatment. The temperature of the gas in the conduit 42 is approximately 35°C and its absolute pressure is approximately 26 atmospheres.

The condensates accumulated in the coolers 23 and 30 are returned to a storage tank 34 through conduits 31, 32, and 33. From the storage tank 34 the water can be added to the circulating warm-water cycle in the plant through a conduit 35, a pump 36, and a conduit 37.

The exothermic heat generated in the reactions represented hereinbefore by equilibrium equations I, II, and III, in accordance with the process of the invention, is for the most part utilized as follows:

a. in the warm-water cycle which circulates through the heat exchanger 10, the cooler 15, the humidifier 2, and the dehumidifier 19, and
b. for the generation of additional steam in the waste-heat boiler 17 in combination with the feed-water preheater 22.

The entering gas that is to be methanated is humidified in the humidifier 2 with water from the warm-water cycle so that no fresh water is required for the partial conversion reaction in reactor 7.

The flow in the warm-water cycle is as follows:

The cold water flows through conduit 20 to the dehumidifier 19, from there through the conduit 38, a pump 39, a conduit 40, and the heat exchanger 10, and a conduit 41, the cooler 15, and through the conduit 3 to the humidifier 2. Heat from the heat exchanger 10, cooler 15, and dehumidifier 19 that is supplied to the circulating warm water is required in the humidifier 2 for supplying the water vapor that is taken up by the gases passing therethrough.

The steam-generating system operates as follows:

The feed water that is supplied through a conduit 43 to the plant is impelled by a pump 44 through a conduit 45 into the feed-water heater 22 to the waste-heat boiler 17. The steam is collected in a drum 46 and is passed through a conduit 47 to wherever it will be consumed.

The quantity of the additional steam that is generated and taken off through the conduit 47 is equivalent to approximately 75 cubic meters at a temperature of 200°C for each 1000 cubic meters of gas at normal temperature and pressure that is treated in the process. If necessary, additional condensate can be fed into the process cycle through a conduit 51.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for the production of a methane-containing gas having a methane content between 40 and 99% by volume from a gas mixture which contains hydrogen, carbon dioxide and at least 20% by volume of carbon monoxide by catalytic conversion and methanation reactions which comprises the following steps in the specified sequence:

a. humidifying the gas mixture containing hydrogen, carbon dioxide and at least 20% by volume of carbon monoxide by passing the incoming gas mixture into contact with water heated as defined below in (g),
b. subjecting the humidified gas mixture to a partial conversion so as to reduce its content of carbon monoxide to between 10 and 20% by volume and produce a hot partially converted gas mixture,
c. desulfurizing the partially converted gas mixture,
d. subjecting the desulfurized gas mixture to a first catalytic methanation step and produce a hot methanated gas mixture,
e. cooling and dehumidifying the resulting gas mixture,
f. reheating the said cooled dehumidified gas mixture and subjecting it to a second catalytic methanation step prior to discharge, and
g. circulating the heating and cooling water in one common circuit, the water first passing in heat-exchange relation with the hot gas mixture discharged from the conversion step (above b) and then with the hot methanated gas mixture discharged from the first methanation step (above d) and the thus heated-up water thereupon being passed into direct contact with the incoming gas mixture in the humidifier (above a) where the said gas mixture is heated and saturated with water vapor to provide the water required in the conversion reaction, whereupon the cooled-down water discharged from the humidifier is passed into the dehumidifier (above e) into contact with the hot methanated gas mixture received from the first methanation step for washing and cooling the methanated gas mixture, the discharged water, including the condensed water withdrawn from the methanated gas mixture, being passed back into said circulation circuit.

2. A process as defined in claim 1 in which the partial conversion step b of the gas mixture is conducted at a gradually increasing temperature between 350° and 550°C, the first methanation step d at a gradually increasing temperature between 300° and 500°C, and the second methanation step at a gradually increasing temperature between 300° and 320°C.

3. A process as defined in claim 1 in which both methanation steps d and f are conducted in reactors packed with a granular methanation catalyst.

4. A process as defined in claim 1 in which the first methanation step d is conducted in a reactor divided by a partition into two separate sections each of which is packed with a bed of granular methanation catalyst disposed one above the other and between which are disposed means for withdrawing the gaseous mixture from the bottom of the upper section and cooling the same and returning the cooled gas mixture to the top of the lower section.

5. A process as defined in claim 1 in which the desulfurization in step c is effected with a desulfurization agent containing zinc oxide or manganese oxide or a mixture of both.

6. A process as defined in claim 1 in which the methanation step *d* is conducted in such a manner that the temperature of the gas mixture as it enters the bed of the methanation catalyst is at least 300°C and is prevented from increasing to a temperature substantially above 500°C as the gas mixture passes through the catalyst bed.

7. A process as defined in claim 1 wherein additional water is converted to steam in a waste-heat boiler heated by the hot methanated gas mixture from at least one of the methanation steps and is discharged for external use while condensed water from the dehumidified gas mixture and from the methanated gas mixture that has passed through the second methanation step is collected for storage to be passed back into said circulation circuit.

8. A process for the production of a methane-containing gas having a methane content between 40 and 99% by volume from a gas mixture which contains hydrogen, carbon dioxide, and at least 20% by volume of carbon monoxide by catalytic conversion and methanation reactions which comprises the following steps in the specified sequence:

a. passing the stream of the incoming gas mixture at a superatmospheric pressure into a humidifier, b. passing water heated as defined below at (*j*) into the said humidifier to humidify and warm the gas mixture passing therethrough, c. passing the warm and humidified gas mixture from the humidifier through a first heat exchanger to heat the gas mixture to a higher temperature and then through a converter containing a conversion catalyst that is maintained at a superatmospheric pressure and a temperature between 300° and 550°C to reduce the carbon monoxide content of the gas mixture to between 10 and 20% by volume by partial catalytic conversion of the gas mixture, d. passing the converted gas mixture from the converter successively through said first heat exchanger and a second heat exchanger to cool the said gas mixture and then through a desulfurizing unit, e. passing the desulfurized gas mixture from the desulfurizing unit through a first methanation reactor consisting of two individual beds of a conventional methanation catalyst that are separated from each other by an intermediate partition and a cooling unit through which the gas mixture passes and is cooled to a temperature not substantially above 500°C before passing into the second bed of catalyst of the methanation reactor, f. cooling the methanated gas mixture by passing it from the methanation reactor through a waste-heat boiler, g. passing the cooled gas mixture into and through a dehumidifier, h. passing cold water from the humidifier into the dehumidifier to wash the cooled gas mixture to thereby condense at least a portion of the water vapor from the gas mixture passing therethrough, i. passing the gas mixture that was thus cooled and washed with water from the dehumidifier through a third heat exchanger and a second methanation reactor, while j. passing the water and condensate from the dehumidifier successively through the second heat exchanger and the cooling unit connected to the first methanation reactor to heat the said water and circulating the heated water into the humidifier to supply the water that is required in the humidification step *b* to warm and humidify the gas mixture whereupon the cooled water is discharged into the dehumidifier (step *h*) before being recirculated.

* * * * *